US012608534B2

(12) United States Patent
Shahul Hamid

(10) Patent No.: US 12,608,534 B2
(45) Date of Patent: Apr. 21, 2026

(54) MANAGING DATA TRANSFORMATION TOOLS USING GENERATIVE ARTIFICIAL INTELLIGENCE

(71) Applicant: International Business Machines Corporation, Armonk, NY (US)

(72) Inventor: Ahamed Jalaldeen Shahul Hamid, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 18/407,772

(22) Filed: Jan. 9, 2024

(65) Prior Publication Data

US 2025/0225313 A1      Jul. 10, 2025

(51) Int. Cl.
*G06F 40/143* (2020.01)
*G06F 40/151* (2020.01)

(52) U.S. Cl.
CPC .......... *G06F 40/151* (2020.01); *G06F 40/143* (2020.01)

(58) Field of Classification Search
CPC .............................. G06F 40/151; G06F 40/143
USPC ....................................................... 707/756
See application file for complete search history.

(56) References Cited

U.S. PATENT DOCUMENTS

| | | | |
|---|---|---|---|
| 7,853,553 B2 | 12/2010 | Lankinen et al. | |
| 10,949,381 B2 | 3/2021 | Cruz et al. | |
| 11,045,271 B1 * | 6/2021 | Tran ........................ | G06N 20/00 |
| 2005/0149536 A1 | 7/2005 | Wildes et al. | |
| 2006/0173985 A1 * | 8/2006 | Moore .................... | H04L 67/00 |
| | | | 707/E17.116 |
| 2010/0281072 A1 | 11/2010 | Cicman et al. | |
| 2022/0075796 A1 * | 3/2022 | Lindsay ................ | G06F 16/258 |
| 2022/0164207 A1 * | 5/2022 | Velammal ........... | G06F 11/0772 |
| 2025/0165695 A1 * | 5/2025 | Voicu .................... | G06F 40/166 |

FOREIGN PATENT DOCUMENTS

| | | | |
|---|---|---|---|
| CN | 120104132 A | * | 6/2025 |

OTHER PUBLICATIONS

EXTOL, "Design-Time Automation Strategies for Business Integration," Nov. 20, 2013, 26 pages, EXTOL International, Inc., Pottsville, Pennsylvania, accessed Dec. 27, 2023, https://www.tug.ca/MoMHandouts/2013-11-20/EXTOL_Nov20Session_WPhandout.pdf.

(Continued)

*Primary Examiner* — Kuen S Lu
(74) *Attorney, Agent, or Firm* — Yee & Associates, P.C.

(57) ABSTRACT

A computer implemented method manages data transformation tools. A processor set selects a foundation model to retrieve content of respective user manuals for a number of data transformation tools. The processor set generates a large language model from the foundation model based on the content of user manuals for the number of data transformation tools and a number of scripts for automation bots for the number of data transformation tools. The processor set generates a number of new automation bots for each data transformation tool in the number of data transformation tools using the large language model. The processor set performs a number of operations associated with data transformation maps in the number of data transformation tools using the number of new automaton bots.

17 Claims, 9 Drawing Sheets

(56) References Cited

OTHER PUBLICATIONS

IBM, "Mapping and Data Transformation Components," IBM Sterling B2B Integrator, May 11, 2022, 6 pages, International Business Machines Corporation, accessed Dec. 21, 2023, https://www.ibm.com/docs/en/b2b-integrator/5.2?topic=integrator-mapping-data-transformation-components.

IBM, "Migrating an XML Map," IBM Business Automation Workflow, Jun. 27, 2023, 2 pages, International Business Machines Corporation, accessed Dec. 21, 2023, https://www.ibm.com/docs/en/baw/22.x?topic=transformations-migrating-XML-map.

IBM, "What's new in IBM watsonx Orchestrate," IBM Documentation, Updated Sep. 29, 2023, 12 pages, accessed Dec. 22, 2023, https://www.ibm.com/docs/en/watson-orchestrate?topic=notes-whats-new-in-watsonx-orchestrate.

* cited by examiner

COMPUTING ENVIRONMENT
100

FIG. 1

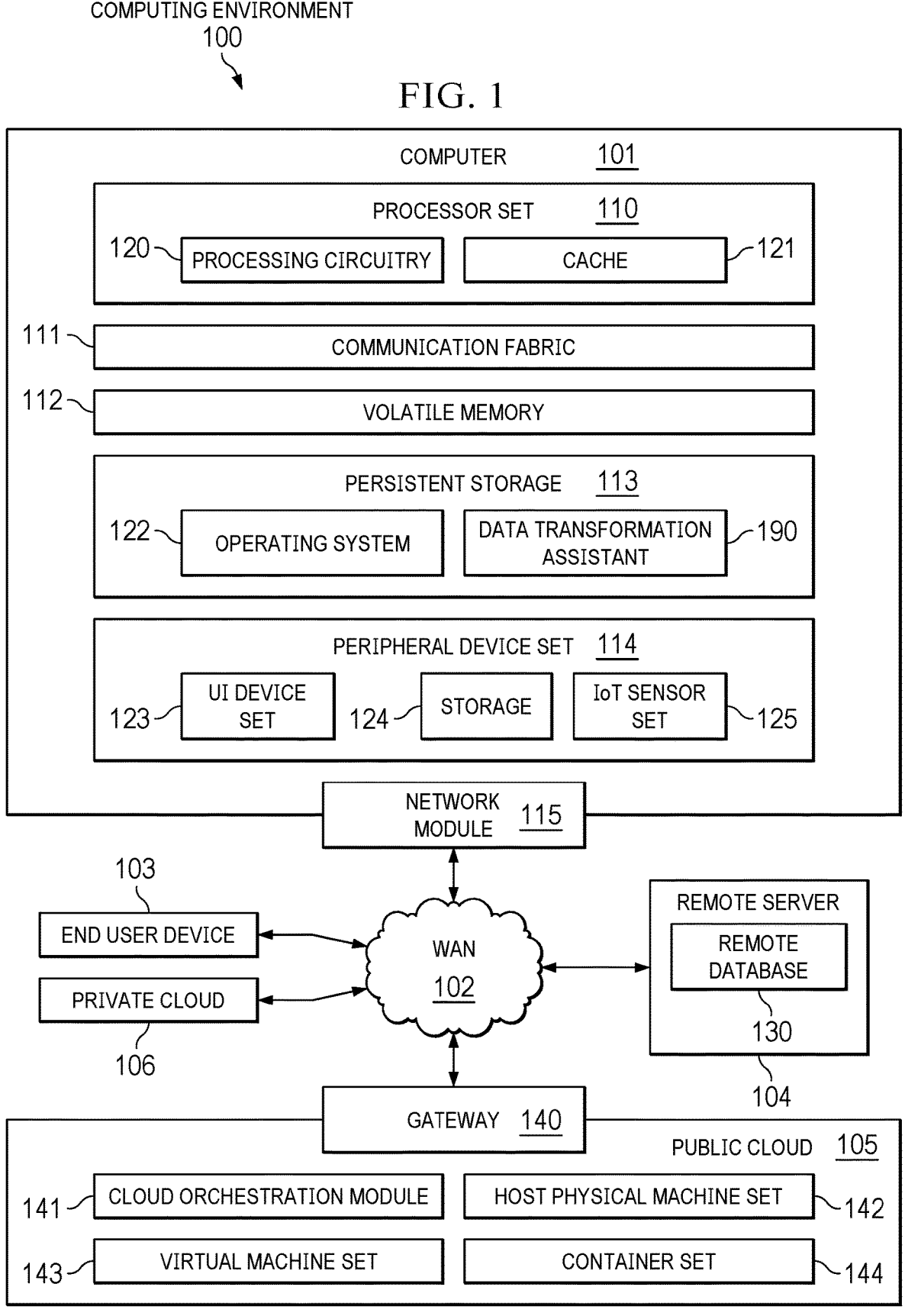

COMPUTER        101

PROCESSOR SET        110

120 — PROCESSING CIRCUITRY

CACHE — 121

111 — COMMUNICATION FABRIC

112 — VOLATILE MEMORY

PERSISTENT STORAGE        113

122 — OPERATING SYSTEM

DATA TRANSFORMATION ASSISTANT — 190

PERIPHERAL DEVICE SET        114

123 — UI DEVICE SET

124 — STORAGE

IoT SENSOR SET — 125

NETWORK MODULE        115

103

END USER DEVICE

PRIVATE CLOUD

106

WAN        102

REMOTE SERVER

REMOTE DATABASE

130

104

GATEWAY        140

PUBLIC CLOUD        105

141 — CLOUD ORCHESTRATION MODULE

HOST PHYSICAL MACHINE SET — 142

143 — VIRTUAL MACHINE SET

CONTAINER SET — 144

402

| SOURCE OBJECT | SOURCE FIELD | TARGET OBJECT | TARGET FIELD | RULE |
|---|---|---|---|---|
| 404 | 406 | 408 | 410 | 412 |
| CUSTOMER | ID | CUST | CustNumber | Customer.Id |
| CUSTOMER | FirstName | CUST | NAME | concat(Customer.FirstName + Customer.LastName) |
| CUSTOMER | LastName | | | |
| CUSTOMER | ADDRESS | CUST | StreetName | left(Customer.Address, 20) |
| | | CUST | CITY | right(Customer.Address, 10) |
| CUSTOMER | PhoneNumber | CUST | ContactNumber | Customer.Phone.Number |

FIG. 4

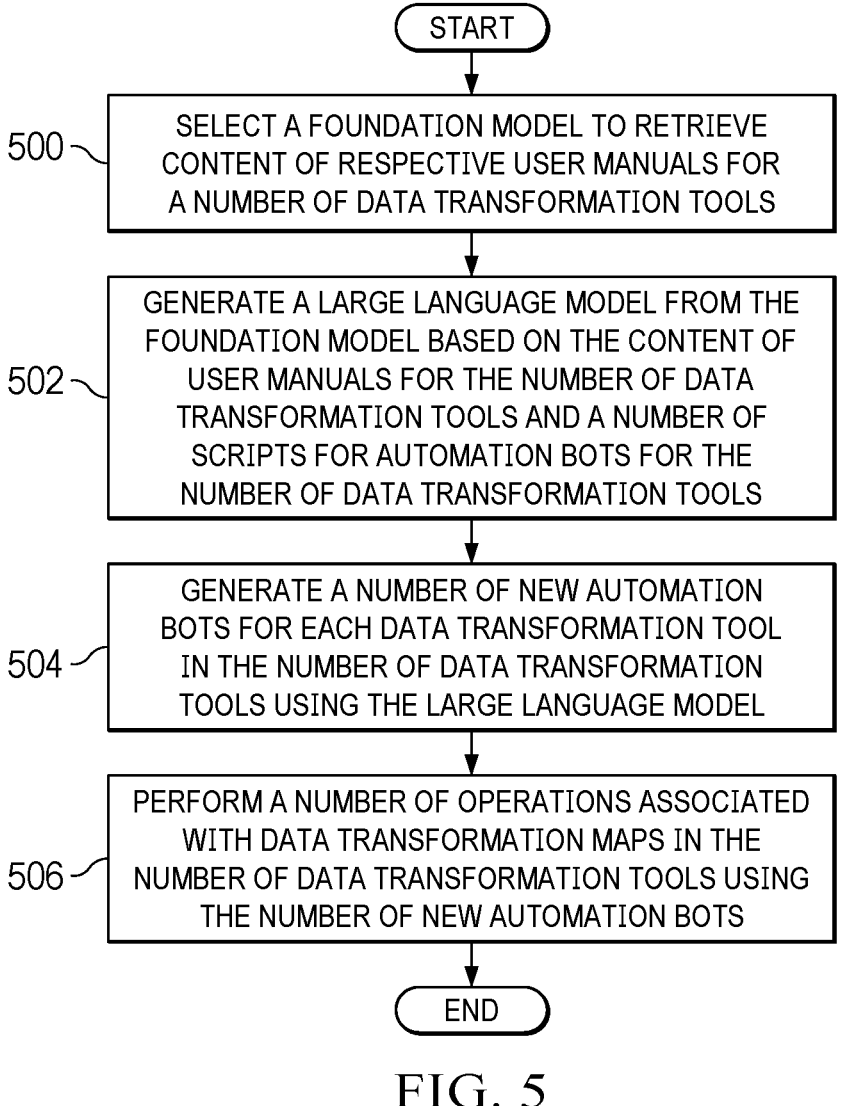

START

500 — SELECT A FOUNDATION MODEL TO RETRIEVE CONTENT OF RESPECTIVE USER MANUALS FOR A NUMBER OF DATA TRANSFORMATION TOOLS

502 — GENERATE A LARGE LANGUAGE MODEL FROM THE FOUNDATION MODEL BASED ON THE CONTENT OF USER MANUALS FOR THE NUMBER OF DATA TRANSFORMATION TOOLS AND A NUMBER OF SCRIPTS FOR AUTOMATION BOTS FOR THE NUMBER OF DATA TRANSFORMATION TOOLS

504 — GENERATE A NUMBER OF NEW AUTOMATION BOTS FOR EACH DATA TRANSFORMATION TOOL IN THE NUMBER OF DATA TRANSFORMATION TOOLS USING THE LARGE LANGUAGE MODEL

506 — PERFORM A NUMBER OF OPERATIONS ASSOCIATED WITH DATA TRANSFORMATION MAPS IN THE NUMBER OF DATA TRANSFORMATION TOOLS USING THE NUMBER OF NEW AUTOMATION BOTS

END

DATA PROCESSING SYSTEM

1016

1006  STORAGE DEVICES  1008

1004

PROCESSOR UNIT

MEMORY

PERSISTENT STORAGE

COMMUNICATIONS FRAMEWORK

1002

COMMUNICATIONS UNIT

INPUT/OUTPUT UNIT

DISPLAY

1010

1012

1014

1020  COMPUTER PROGRAM PRODUCT

COMPUTER-READABLE MEDIA

PROGRAM INSTRUCTIONS

1022

1018

COMPUTER-READABLE STORAGE MEDIA

1024

MANAGING DATA TRANSFORMATION TOOLS USING GENERATIVE ARTIFICIAL INTELLIGENCE

BACKGROUND

The disclosure relates generally to an improved computer system and more specifically to managing data transformation tools for data manipulation.

Data transformation tools are software products that are designed to facilitate the process of converting data from one format, structure, or representation to another. Data transformation tools can be used to manipulate, refine, and enrich data to meet the requirements needed for a specific software application. Therefore, data transformation tools play important roles in data manipulation, data integration, and data extraction processes.

Data transformation tools usually provide a graphical user interface and/or scripting capability for defining mapping and transformation logic of data across different software applications. In this case, the transformation logic indicates how data from diverse sources should be manipulated to meet the desired format or structure of other software applications.

With the increased adoption of data transformation tools, organizations can extract maximum value from data and exchange data freely without the concern of external data being incompatible. As a result, the use of data transformation tools enables organizations to optimize data manipulation and refinement across different software applications.

SUMMARY

According to one illustrative embodiment, a computer implemented method manages data transformation tools. A processor set selects a foundation model to process respective user manuals for a number of data transformation tools. The processor set generates a large language model from the foundation model based on user manuals for the number of data transformation tools and a number of scripts for automation bots for the number of data transformation tools. The processor set generates a number of new automation bots for each data transformation tool in the number of data transformation tools using the large language model. The processor set performs a number of operations associated with data transformation maps in the number of data transformation tools using the number of new automaton bots. According to other illustrative embodiments, a computer system, and a computer program product for managing data transformation tools are provided.

BRIEF DESCRIPTION OF THE DRAWINGS

FIG. 1 is an illustration of a block diagram of a computing environment in accordance with an illustrative embodiment;

FIG. 4 is an exemplary mapping specification in accordance with an illustrative embodiment;

FIG. 5 is a flowchart of a process for managing data transformation tools in accordance with an illustrative embodiment;

DETAILED DESCRIPTION

Figure 2:
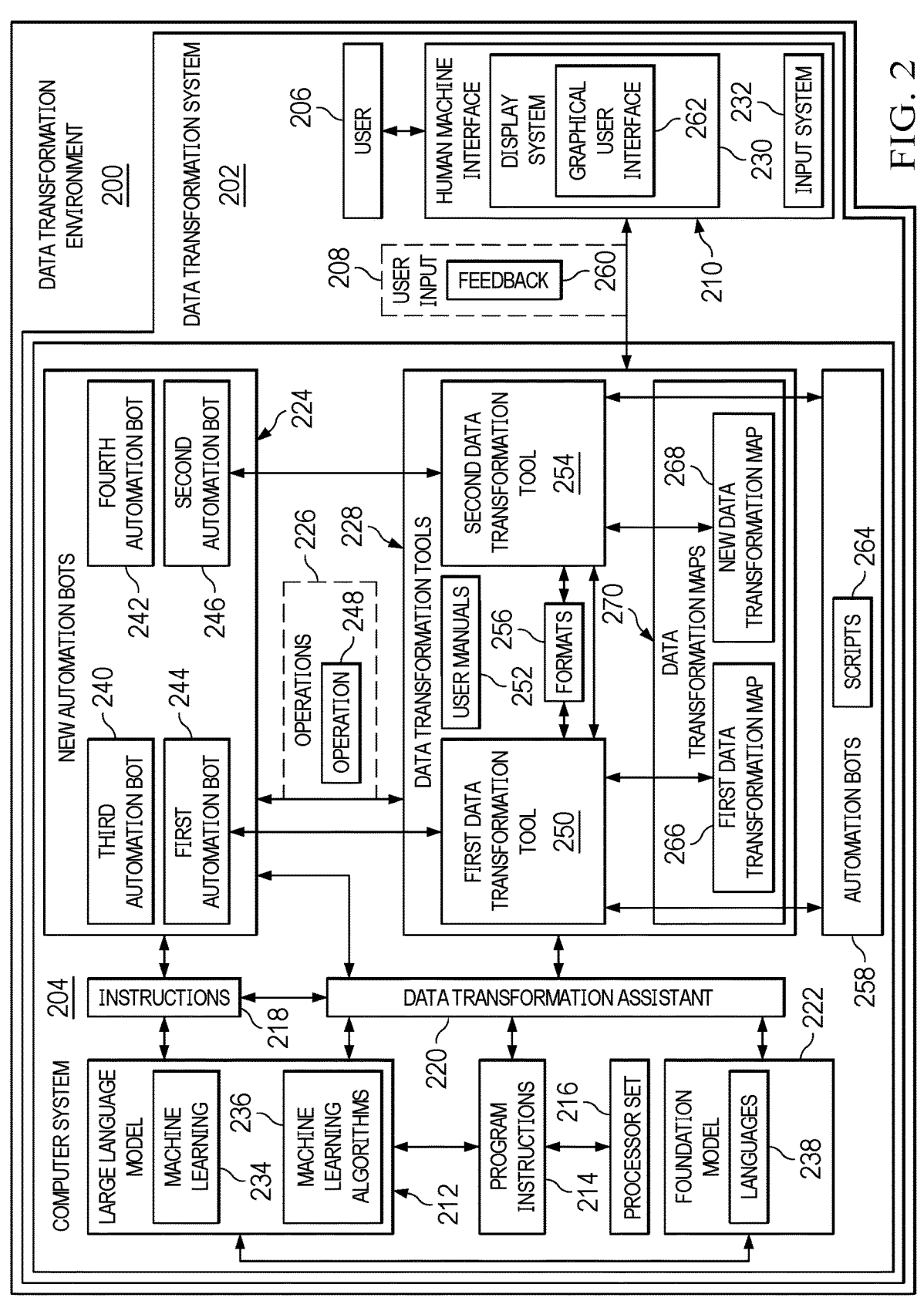
FIG. 2 is an illustration of a block diagram of a data transformation environment in accordance with an illustrative embodiment.

A computer implemented method manages data transformation tools. A processor set selects a foundation model to process respective user manuals for a number of data transformation tools. The number of data transformation tools use different data formats to store information. The processor set generates a large language model from the foundation model based on user manuals for the number of data transformation tools and a number of scripts for automation bots for the number of data transformation tools. The large language model is an artificial intelligence model that performs natural language processing to generate instructions for automation bots based on the user manuals and the number of scripts for the automation bots. The processor set generates a number of new automation bots for each data transformation tool in the number of data transformation tools using the large language model. Each new automation bot is configured to perform an operation in data transformation tools associated with each new automation bot. The processor set performs a number of operations associated with data transformation maps in the number of data transformation tools using the number of new automation bots. As a result, the illustrative embodiments provide a technical effect of generating automation bots based on a specifically trained large language model and automate the workflow for data transformation tools.

In the illustrative embodiments, as part of performing a number of operations associated with data transformation maps in the number of data transformation tools using the number of new automation bots, the processor set selects a first data transformation tool and a second data transformation tool from the number of data transformation tools. The processor set retrieves a first data transformation map from the first data transformation tool using a first automation bot for the first data transformation tool. The first data transformation map is a pre-existing data transformation map, and the first automation bot is an automation bot from the number of new automation bots. The processor set creates a first mapping specification based on the first data transformation map using the first automation bot for the first data transformation tool. The processor set retrieves the first mapping specification using a second automation bot for the second data transformation tool. The second automation bot is an automation bot from the number of new automation bots. The processor set creates a new data transformation map in the second data transformation tool based on the first mapping specification using the second automation bot for the second data transformation tool. Thus, the illustrative embodiments provide a technical effect of automating migration of data transformation maps from a data transformation tool to another data transformation tool.

In the illustrative embodiments, as part of performing a number of operations associated with data transformation maps in the number of data transformation tools using the number of new automation bots, the processor set selects a data transformation tool from the number of data transformation tools. The processor set retrieves a mapping specification and a data transformation map for the selected data transformation tool using a third automation bot for the selected data transformation tool. The third automation bot is an automation bot from the number of new automation bots. The processor set modifies the data transformation map based on the mapping specification in the selected data transformation tool using the third automation bot for the selected data transformation tool. As a result, the illustrative embodiments provide a technical effect of automating modification of data transformation maps in a data transformation tool.

In the illustrative embodiments, as part of performing a number of operations associated with data transformation maps in the number of data transformation tools using the number of new automation bots, the processor set selects a data transformation tool from the number of data transformation tools. The processor set retrieves a mapping specification for the data transformation tool using a fourth automation bot for the data transformation tool. The fourth automation bot is an automation bot from the number of new automation bots. The processor set creates a new data transformation map in the data transformation tool using the fourth automation bot for the data transformation tool. As a result, the illustrative embodiments provide a technical effect of automating creation of data transformation maps in a data transformation tool.

In the illustrative embodiments, the processor set integrates the number of new automation bots for the number of data transformation tools into an orchestration tool to automate workflows for the number of new automation bots. As a result, the illustrative embodiments provide a technical effect of using an orchestration tool to integrate all new automation bots and provide a platform for automating workflows in different scenarios for all new automation bots.

In the illustrative embodiments, the number of operations in the number of data transformation tools are performed using visual data transformation map designers of respective data transformation tools or through HTML export of transformation maps. Thus, the illustrative embodiments provide a technical effect of using automation bots to perform operations in a specially designed user interface or through HTML export of data transformation maps for each data transformation tool.

In the illustrative embodiments, the foundation model is selected based on language used in the user manuals for the number of data transformation tools. Thus, the illustrative embodiments provide a technical effect of training the foundation model to generate a large language model that is specific to the language used for particular scenarios.

A computer system comprises a processor set, a set of one or more computer-readable storage media, and program instructions, collectively stored in the set of one or more storage media, for causing the processor set to perform the following computer operations. The processor set selects a foundation model to process respective user manuals for a number of data transformation tools. The number of data transformation tools use different data formats to store information. The processor set generates a large language model from the foundation model based on user manuals for the number of data transformation tools and a number of scripts for automation bots for the number of data transformation tools. The large language model is an artificial intelligence model that performs natural language processing to generate instructions for automation bots based on the user manuals and the number of scripts for the automation bots. The processor set generates a number of new automation bots for each data transformation tool in the number of data transformation tools using the large language model. Each automation bot is configured to perform an operation in data transformation tools associated with each new automation bot. The processor set performs a number of operations associated with data transformation maps in the number of data transformation tools using the number of new automation bots. As a result, the illustrative embodiments provide a technical effect of generating automation bots based on a specifically trained large language model and automate the workflow for data transformation tools.

In the illustrative embodiments, as part of performing a number of operations associated with data transformation maps in the number of data transformation tools using the number of new automation bots, the processor set further executes the program instructions to select a first data transformation tool and a second data transformation tool from the number of data transformation tools. The processor set further executes the program instructions to retrieve a first data transformation map from the first data transformation tool using a first automation bot for the first data transformation tool. The first data transformation map is a pre-existing data transformation map, and the first automation bot is an automation bot from the number of new automation bots. The processor set further executes the program instructions to create a first mapping specification based on the first data transformation map using the first automation bot for the first data transformation tool. The processor set further executes the program instructions to retrieve the first mapping specification using a second automation bot for the second data transformation tool. The second automation bot is an automation bot from the number of new automation bots. The processor set further executes the program instructions to create a new data transformation map in the second data transformation tool based on the first mapping specification using the second automation bot for the second data transformation tool. Thus, the illustrative embodiments provide a technical effect of automating migration of data transformation maps from a data transformation tool to another data transformation tool.

In the illustrative embodiments, as part of performing a number of operations associated with data transformation maps in the number of data transformation tools using the number of new automation bots, the processor set further executes the program instructions to select a data transformation tool from the number of data transformation tools. The processor set further executes the program instructions to retrieve a mapping specification and a data transformation map for the selected data transformation tool using a third automation bot for the selected data transformation tool. The third automation bot is an automation bot from the number of new automation bots. The processor set further executes the program instructions to modify the data transformation map based on the mapping specification in the selected data transformation tool using the third automation bot for the selected data transformation tool. As a result, the illustrative embodiments provide a technical effect of automating modification of data transformation maps in a data transformation tool.

In the illustrative embodiments, as part of performing a number of operations associated with data transformation maps in the number of data transformation tools using the number of new automation bots, the processor set further executes the program instructions to select a data transformation tool from the number of data transformation tools. The processor set further executes the program instructions to retrieve a mapping specification for the data transformation tool using a fourth automation bot for the data transformation tool. The fourth automation bot is an automation bot from the number of new automation bots. The processor set further executes the program instructions to create a new data transformation map in the data transformation tool using the fourth automation bot for the data transformation tool. As a result, the illustrative embodiments provide a technical effect of automating the creation of a data transformation map in a data transformation tool.

In the illustrative embodiments, the processor set further executes the program instructions to integrate the number of new automation bots for the number of data transformation tools into an orchestration tool to automate workflows for the number of new automation bots. As a result, the illustrative embodiments provide a technical effect of using an orchestration tool to integrate all new automation bots and provide a platform for automating workflows in different scenarios for all new automation bots.

In the illustrative embodiments, the number of operations in the number of data transformation tools are performed using visual data transformation map designers of respective data transformation tools or through HTML export of data transformation maps. Thus, the illustrative embodiments provide a technical effect of using automation bots to perform operations in a specially designed user interface for each data transformation tool.

In the illustrative embodiments, the foundation model is selected based on language used in the user manuals for the number of data transformation tools. Thus, the illustrative embodiments provide a technical effect of training the foundation model to generate a large language model that is specific to the language used for particular scenarios.

In the illustrative embodiments, a computer program product manages data transformation tools. The computer program product comprises a set of one or more computer-readable storage media and program instructions, collectively stored in the set of one or more storage media, for causing a processor set to perform the following computer operations. The program instructions are executable by a computer system to select a foundation model to process respective user manuals for a number of data transformation tools. The number of data transformation tools use different data formats to store information. The program instructions are executable by a computer system to cause the computer system to generate a large language model from the foundation model based on user manuals for the number of data transformation tools and a number of scripts for automation bots for the number of data transformation tools. The large language model is an artificial intelligence model that performs natural language processing to generate instructions for automation bots based on the user manuals and the number of scripts for the automation bots. The program instructions are executable by a computer system to cause the computer system to generate a number of new automation bots for each data transformation tool in the number of data transformation tools using the large language model. Each new automation bot is configured to perform an operation in data transformation tools associated with each new automation bot. The program instructions are executable by a computer system to cause the computer system to perform a number of operations associated with data transformation maps in the number of data transformation tools using the number of new automation bots. As a result, the illustrative embodiments provide a technical effect of generating automation bots based on a specifically trained large language model and automate the workflow for data transformation tools.

In the illustrative embodiments, as part of performing a number of operations associated with data transformation maps in the number of data transformation tools using the number of new automation bots, the program instructions are further executable by the computer system to cause the computer system to select a first data transformation tool and a second data transformation tool from the number of data transformation tools. The program instructions are further executable by the computer system to cause the computer system to retrieve a first data transformation map from the first data transformation tool using a first automation bot for the first data transformation tool. The first data transformation map is a pre-existing data transformation map, and the first automation bot is an automation bot from the number of new automation bots. The program instructions are further executable by the computer system to cause the computer system to create a first mapping specification based on the first data transformation map using the first automation bot for the first data transformation tool. The program instructions are further executable by the computer system to cause the computer system to retrieve the first mapping specification using a second automation bot for the second data transformation tool. The second automation bot is an automation bot from the number of new automation bots. The program instructions are further executable by the computer system to cause the computer system to create a new data transformation map in the second data transformation tool based on the first mapping specification using the second automation bot for the second data transformation tool. Thus, the illustrative embodiments provide a technical effect of automating migration of data transformation maps from a data transformation tool to another data transformation tool.

In the illustrative embodiments, as part of performing a number of operations associated with data transformation maps in the number of data transformation tools using the number of new automation bots, the program instructions are further executable by the computer system to cause the computer system to select a data transformation tool from the number of data transformation tools. The program instructions are further executable by the computer system to cause the computer system to retrieve a mapping specification and a data transformation map for the selected data transformation tool using a third automation bot for the selected data transformation tool. The third automation bot is an automation bot from the number of new automation bots. The program instructions are further executable by the computer system to cause the computer system to modify the data transformation map based on the mapping specification in the selected data transformation tool using the third automation bot for the selected data transformation tool. As a result, the illustrative embodiments provide a technical effect of automating the modification of data transformation maps in a data transformation tool.

In the illustrative embodiments, as part of performing a number of operations associated with data transformation maps in the number of data transformation tools using the number of new automation bots, the program instructions are further executable by the computer system to cause the computer system to select a data transformation tool from the number of data transformation tools. The program instructions are further executable by the computer system to cause the computer system to retrieve a mapping specification for the data transformation tool using a fourth automation bot for the data transformation tool. The fourth automation bot is an automation bot from the number of new automation bots. The program instructions are further executable by the computer system to cause the computer system to create a new data transformation map in the data transformation tool using the fourth automation bot for the data transformation tool. As a result, the illustrative embodiments provide a technical effect of automating the creation of data transformation maps in a data transformation tool.

In the illustrative embodiments, the program instructions are further executable by the computer system to cause the computer system to integrate the number of new automation bots for the number of data transformation tools into an orchestration tool to automate workflows for the number of new automation bots. As a result, the illustrative embodiments provide a technical effect of using orchestration tools to integrate all new automation bots and provide a platform for automating workflows in different scenarios for all new automation bots.

In the illustrative embodiments, the number of operations in the number of data transformation tools are performed using visual data transformation map designers of respective data transformation tools or through HTML export of data transformation maps. Thus, the illustrative embodiments provide a technical effect of using automation bots to perform operations in a specially designed user interface for each data transformation tool.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine-readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, an illustration of a block diagram of a computing environment is depicted in accordance with an illustrative embodiment. Computing environment 100 contains an example of an environment for the execution of at least some of the computer code involved in performing the inventive methods, such as data transformation assistant 190. In addition to data transformation assistant 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data transformation assistant 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data transformation assistant 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in data transformation assistant 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that data transformation tools in different software applications use different proprietary formats to store information. The illustrative embodiments also recognize and take into account that currently there is no method for migrating information of one data transformation tool to another data transformation tool across different software applications in an automated manner.

CLOUD COMPUTING SERVICES AND/OR MICRO-SERVICES (not separately shown in FIG. 1): private cloud 106 and public cloud 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account that due to the nature of manual migration of data, it is difficult to get, motivate, and retain technical practitioners with skills, knowledge, and experience on number of data transformation tools for the duration of migration projects.

The illustrative embodiments also recognize and take into account that manual effort in operations associated with data transformation maps poses various challenges that can impact the efficiency and reliability of the operations. In this case, manual cleaning, formatting, and processing data can lead to increased costs and potential delays. Further, the illustrative embodiments also recognize and take into account that manual processes are prone to human errors that can compromise the quality of transformed data.

Thus, illustrative embodiments provide a computer implemented method, apparatus, system, and computer program product for managing different data transformation tools. This management includes migration, modification, and creation of data transformation maps in data transformation tools for different software applications. In one illustrative example, a processor set selects a foundation model to process respective user manuals for a number of data transformation tools. The processor set generates a large language model from the foundation model based on user manuals for the number of data transformation tools and a number of scripts for automation bots for the number of data transformation tools. The processor set generates a number of new automation bots for each data transformation tool in the number of data transformation tools using the large language model. The processor set performs a number of operations associated with data transformation maps in the number of data transformation tools using the number of new automation bots.

As used in herein, a "number of" when used with reference to items means one or more items. For example, a number of processor units is one or more processors.

With reference now to FIG. 2, an illustration of a block diagram of a data transformation environment is depicted in accordance with an illustrative embodiment. In this illustrative example, data transformation environment 200 includes components that can be implemented in hardware such as the hardware shown in computing environment 100 in FIG. 1.

In this illustrative example, data transformation system 202 in data transformation environment 200 manages data transformation tools that can be used for data manipulations. In this illustrative example, data transformation system 202 includes computer system 204 and data transformation assistant 220. Data transformation assistant 220 is located in computer system 204. Data transformation assistant 220 may be implemented using data transformation assistant 190 in FIG. 1.

Data transformation assistant 220 can be implemented in software, hardware, firmware, or a combination thereof. When software is used, the operations performed by data transformation assistant 220 can be implemented in program instructions configured to run on hardware, such as a processor unit. When firmware is used, the operations performed by data transformation assistant 220 can be implemented in program instructions and data and stored in persistent memory to run on a processor unit. When hardware is employed, the hardware can include circuits that operate to perform the operations in data transformation assistant 220.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes data transformation tools 228. Data transformation tools 228 have formats 256 that define the format for storing data in data transformation tools 228. In this illustrative example, data transformation tools 228 are software designed to facilitate the process of converting data from one format in formats 256 to another format in formats 256. Each data transformation tool from data transformation tools 228 can be designed to meet the needs of specific software applications. In this illustrative example, software applications are computer programs designed to perform specific tasks or functions.

For example, first data transformation tool 250 in data transformation tools 228 can be a data transformation tool from a software vendor or open source community and second data transformation tool 254 in data transformation tools 228 can be a data transformation tool from another software vendor or another open source community. In this illustrative example, different software applications can use different formats for storing information. Therefore, it is necessary to convert data into appropriate formats when exchanging data between different software applications. In addition, the usage of data transformation maps in a data transformation tool can help to perform mapping between data formats used in two software applications.

In this illustrative example, data transformation tools 228 further includes user manuals 252 that provide textual information related to features and functionalities for data transformation tools 228. In addition, automation bots 258 can be used to automate tasks performed in data transformation tools 228. Automation bots 258 are software robots for automating repetitive and rule-based operations for data transformation tools in data transformation tools 228 such as first data transformation tool 250 and second data transformation tool 254. In this illustrative example, automation bots 258 can be robotic process automation (RPA) bots that mimic the actions of a human user interacting with digital systems. Automation bots 258 includes scripts 264, which includes program instructions and rules that define the steps for performing operations in data transformation tools 228.

Data transformation assistant 220 can be used to generate new automation bots 224 for data transformation tools 228 for performing operations for data transformation tools 228. In this illustrative example, data transformation assistant 220 can select foundation model 222 based on languages 238 for foundation model 222. In an alternative example, data transformation assistant 220 can select a foundation model 222 based on languages in user manuals 252 from data transformation tools 228. In this illustrative example, foundation model 222 is a pre-trained general purpose model that serves as a base or starting point that can be further trained for specialized tasks. For example, foundation model 222 can be a transformer based generative artificial intelligence or any suitable general purpose model.

In this example, data transformation assistant 220 further trains foundation model 222 using scripts 264 from the automation bots 258 and content from user manuals 252 from data transformation tools 228 to generate large language model 212. Large language model 212 is an artificial intelligence model that performs natural language processing and can help data transformation assistant 220 to generate new automation bots 224 and instructions 218 for new automation bots 224 based on user manuals 252 and scripts 264. In this illustrative example, instructions 218 are program instructions that include steps and details necessary to perform specific operations for data transformation tools 228.

Large language model 212 can include machine learning 234 and machine learning algorithms 236, deep learning and deep learning algorithms. Machine learning 234 is a branch of artificial intelligence (AI) that enables computers to detect patterns and improve performance without direct programming commands. Rather than relying on direct input commands to complete a task, machine learning 234 relies on input data. The data is fed into the machine, one of machine learning algorithms 236 is selected, parameters for the data are configured, and the machine is instructed to find patterns in the input data through optimization algorithms. The data model formed from analyzing the data is then used to predict future values. As depicted, the learning of the large language model can be achieved through using foundation model 222 as a base model and inputs for training based on user manuals 252 and scripts 264.

In addition, large language model 212 can also include deep learning and deep learning algorithms. Deep learning is a method of artificial intelligence that mimics the human brain's capacity to learn and adapt. Deep learning utilizes neural networks that have multiple layers for identifying and learning features from data. In this illustrative example, deep learning can use an iterative process such as backpropagation and gradient descent to refine its parameters to make accurate predictions by minimizing the difference between outputs and actual results.

Large language model 212 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching large language model 212.

Large language model 212 can be implemented using one or more systems such as an artificial intelligence system, a neural network, a generative neural network, a Bayesian network, an expert system, a fuzzy logic system, a genetic algorithm, or other suitable types of systems. Machine learning 234 and machine learning algorithms 236 may make computer system 204 a special purpose computer for generating new automation bots for data transformation tools 228.

Machine learning 234 involves using machine learning algorithms 236 to build large language model 212 based on samples of data. The samples of data used for training are referred to as training data or training datasets. As depicted, large language model 212 is trained by using foundation model 222 as the base model and training datasets from user manuals 252 and scripts 264. Large language model 212 can make predictions without being explicitly programmed to make these predictions. Large language model 212 can be trained and retrained for a number of different types of applications. These applications include, for example, medicine, financial services, healthcare, speech recognition, computer vision, or other types of applications.

Machine learning algorithms 236 can include supervised machine learning algorithms, unsupervised machine learning algorithms, and self-learning algorithms for deep learnings. Supervised machine learning can train machine learning models using data containing both the inputs and desired outputs. Examples of machine learning algorithms include XGBoost, K-means clustering, and random forest.

As depicted, large language model 212 can be used to help data transformation assistant 220 for generating new automation bots 224. New automation bots 224 are software robots that follow instructions 218 to automate repetitive and rule-based operations for data transformation tools in data transformation tools 228. In this illustrative example, new automation bots 224 can be robotic process automation (RPA) bots that mimic the actions of a human user interacting with digital systems.

In this illustrative example, each new automation bot in new automation bots 224 is designed to perform an operation for a particular data transformation tool in data transformation tools 228. In other words, a new automation bot from new automation bots 224 can perform operation 248 selected from operations 226 on a data transformation tool from data transformation tools 228. In this illustrative example, operations 226 can be operations associated with data transformation maps 270 for data transformation tools 228. For example, operations 226 can include processing the existing data transformation map, creating a new data transformation map, modifying an existing data transformation map, and migrating data transformation maps from one data transformation tool to another data transformation tool, or any suitable operations for data transformation tools 228.

For example, first automation bot 244 and second automation bot 246 in new automation bots 224 can be designed for performing migration of data transformation maps from first data transformation tool 250 to second data transformation tool 254 in data transformation tools 228. Migration of data transformation maps can be an example of operations 226 that can be performed by new automation bots 224.

In this illustrative example, data transformation maps are files that contain details of data structures from two software applications and mapping of equivalent fields and objects across the two software applications. In other words, data transformation maps indicate equivalent data in two software applications with different formats. For example, first data transformation map 266 can include details of data structures and mapping of equivalent fields and objects between two software applications in first data transformation tool 250 specific format and another format used for second data transformation tool 254. In this illustrative example, a data transformation map created by migration of first data transformation map 266 from first data transformation tool 250 to second data transformation tool 254 can include details of data structures and mapping of equivalent fields and objects between different formats used in two software applications. In this illustrative example, first data transformation map 266 is a pre-existing data transformation map.

In this illustrative example, first automation bot 244 retrieves first data transformation map 266 from first data transformation tool 250 to generate a mapping specification based on first data transformation map 266. The mapping specification is a data structure that includes information associated with fields in two different software applications and rules for converting the data of a format to data in equivalent fields in another format. In one illustrative example, first automation bot 244 can retrieve information in first data transformation map 266 through HTML export of data transformation maps or any suitable method.

Second automation bot 246 retrieves the mapping specification generated from first data transformation map 266 and creates a new data transformation map 268 based on the mapping specification generated by first automation bot 244. As a result, a migration of data transformation map has been performed from first data transformation tool 250 to second data transformation tool 254.

In another example, third automation bot 240 in new automation bots 224 can be generated for performing modifications of existing data transformation maps. Third automation bot 240 can retrieve a mapping specification and a data transformation map from a data transformation tool from data transformation tools 228. In this example, the mapping specification and the data transformation map are both pre-existing. As a result, third automation bot 240 can modify the data transformation map based on the mapping specification.

In yet another example, fourth automation bot 242 in new automation bots 224 can be generated for performing creation of data transformation maps. Fourth automation bot 242 can retrieve a mapping specification. In this example, the mapping specification is a preexisting mapping specification. As a result, fourth automation bot 242 can create a data transformation map based on the mapping specification.

It should be understood that the illustration of fourth automation bot 242 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, fourth automation bot 242 can be the same automation bot as second automation bot 246 when fourth automation bot 242 retrieves a mapping specification and a data transformation map from second data transformation tool 254.

In this illustrative example, new automation bots 224 can also be integrated into orchestration tools. Orchestration tools are software applications or platforms designed to automate, coordinate, and manage complex operations and workflows. Orchestration tools serve as the centralized controller that oversees the execution of operations in sequence. In this illustrative example, combining individual operations performed by automation bots can lead to multiple operations that can be performed in sequence. In other words, the integration of new automation bots 224 into orchestration tools automates operations 226 performed by new automation bots 224 in data transformation tools 228.

Operations in data transformation tools 228 can also be performed manually. For example, computer system 204 can receive a user input 208 from user 206. In this example, user input 208 can be generated by user 206 using human machine interface (HMI) 210. As depicted, human machine interface 210 includes display system 230 and input system 232. Display system 230 is a physical hardware system and includes one or more display devices on which graphical user interface 262 can be displayed. In this illustrative example, graphical user interface 262 can be a visual data transformation map designer specifically designed for a data transformation tool in data transformation tools 228 or through HTML export of data transformation maps. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 262 through user input 208 generated by input system 232. Input system 232 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In one illustrative example, computer system 204 can receive commands in user input 208 for performing operations manually in data transformation tools 228. However, with the help from new automation bots 224, such manual effort can be avoided since new automation bots 224 can perform operations 226 directly in data transformation tools 228 without manual input.

In this illustrative example, data transformation assistant 220 can display information to user 206 over human machine interface 210. For example, data transformation assistant 220 can display first data transformation map 266 and new data transformation map 268 to user 206.

In this example, user 206 can also review operations 226 performed by new automation bots 224 to determine accuracy for operations 226 performed by new automation bots 224. For example, user 206 can review first data transformation map 266 and new data transformation map 268 as well as other information through graphical user interface 262 to provide feedback 260 to data transformation assistant 220. After reviewing, user 206 can provide feedback 260 through user input 208 to data transformation assistant 220 based on the accuracy of information displayed.

Data transformation assistant 220 can use feedback 260 to perform retraining to improve large language model 212. In this illustrative example, machine learning algorithms 236 in large language model 212 can use feedback from feedback 260 in user input 208 received from user 206 to retrain large language model 212 for generating new automation bots 224 such that accuracy and quality of operations 226 performed by new automation bots 224 in data transformation tools 228 can be improved over time.

In one illustrative example, one or more solutions are present that overcome a problem with performing operations to different data transformation tools that store information in different formats. As a result, one or more technical solutions may provide an ability to increase the efficiency and accuracy in performing operations in different data transformation tools.

Thus, the inconveniences and errors from manually performing operations in data transformation tools associated with data transformation maps in different formats can be reduced through this use of automation bots generated using a large language model trained by textual information from user manuals of data transformation tools.

In the illustrative example, computer system 204 can be configured to perform at least one of the steps, operations, or actions described in the different illustrative examples using software, hardware, firmware, or a combination thereof. As a result, computer system 204 operates as a special purpose computer system in which data transformation assistant 220 in computer system 204 enables managing the execution of training large language model 212, generating new automation bots 224, and using new automation bots 224 to perform operations 226 in data transformation tools 228. In particular, data transformation assistant 220 transforms computer system 204 into a special purpose computer system as compared to currently available general computer systems that do not have a data transformation assistant 220.

In the illustrative example, the use of data transformation assistant 220 in computer system 204 integrates processes into a practical application for managing data transformation tools that increases the performance of computer system 204. In other words, data transformation assistant 220 in computer system 204 is directed to a practical application of processes integrated into data transformation assistant 220 in computer system 204 that selects a foundation model, generates a large language model from the foundation model based on user manuals for data transformation tools, generates new automation bots for the data transformation tools, and performs operations associated with data transformation maps in the data transformation tools using the new automation bots.

The illustration of data transformation environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, new automation bots 224 can include more than four automation bots and include automation bots for operations other than data migration, data modification, and data creation.

Figure 3:
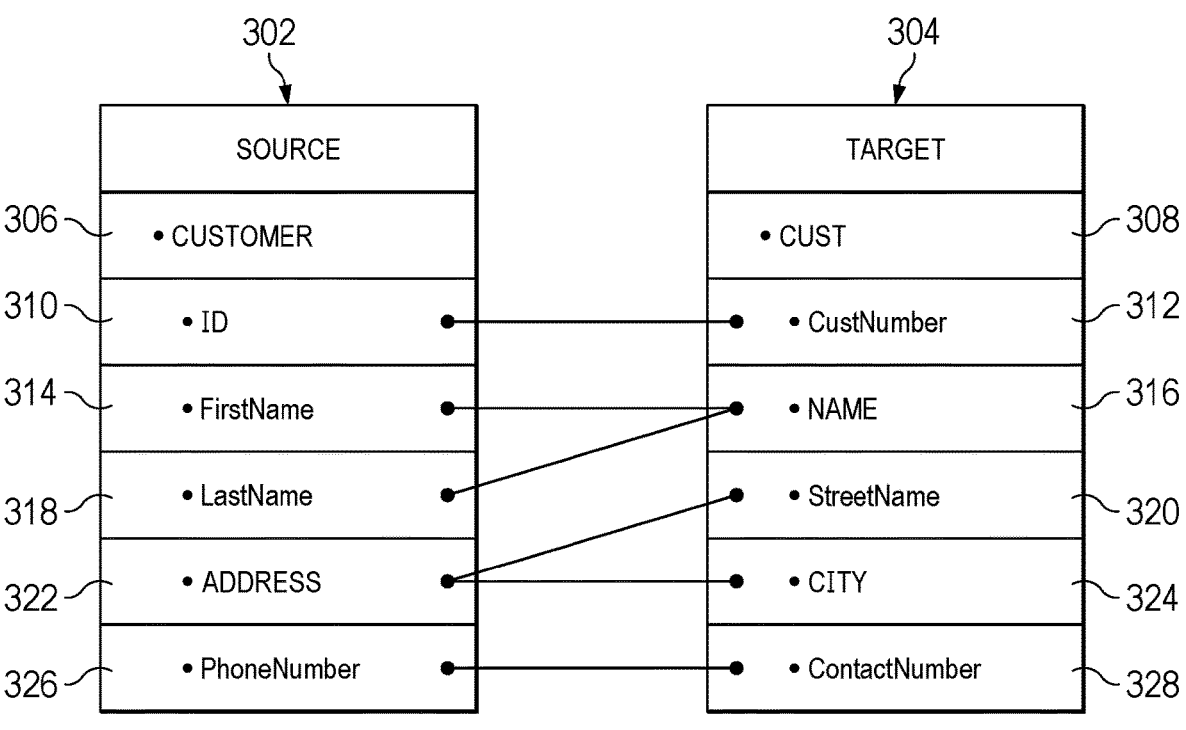
FIG. 3 is an illustration of a visualized data transformation map in accordance with an illustrative embodiment.

Turning now to FIG. 3, an illustration of a visualized data transformation map is depicted in accordance with an illustrative embodiment. In the illustrative examples, the data transformation map shown in FIG. 3 can be an example of first data transformation map 266 and new data transformation map 268 in FIG. 2.

In FIG. 3, a visualization of a data transformation map is depicted to show connections between equivalent objects and fields in two data transformation tools. In this illustrative example, the two data transformation tools can be designed for different software applications. For example, column 302 represents an object for a source software application while column 304 represents an object for a target software application. In this illustrative example, information in the data transformation map shown in FIG. 3 can be used to a generate mapping specifications, which in turn can be utilized by automation bots such as new automation bots 224 in FIG. 2 for performing operations associated with data transformation maps in different data transformation tools.

In this illustrative example, the connections between objects and fields between column 302 and column 304 in FIG. 3 indicate equivalence of data across data formats of two software applications. Equivalent data transformation maps can exist with different proprietary formats in different data transformation tools.

For example, "Customer" of object 306 for the source software application is equivalent to "CUST" of object 308 for the target software application because both objects represent a customer in different formats. In a similar fashion, "ID" of field 310 is equivalent to "CustNumber" of field 312 since both fields represent identification numbers of customers in different formats. In addition, "PhoneNumber" of field 326 is equivalent to "ContactNumber" of field 328 since both fields represent a number that can be used to reach a customer for communication in different formats.

In FIG. 3, a field in one format can have connections to multiple fields in the other formats. For example, "FirstName" of field 314 and "LastName" of field 318 for source software application is equivalent to "Name" of field 316 for target software application because all three fields represent information related to the name of a customer in different formats. In a similar fashion, "Address" of field 322 for source software application is equivalent to "StreetName" of field 320 and "City" of field 324 for target software application because three fields represent information related to the address of a customer in different formats.

It should be understood that the illustration of the data transformation map in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, the data transformation map can include multiple objects and can be visualized, structured, and organized in different ways in different data transformation tools.

Turning now to FIG. 4, an illustration of an exemplary mapping specification is depicted in accordance with an illustrative embodiment. In the illustrative examples, mapping specification 402 shown in FIG. 4 can be an example of a mapping specification generated from the data transformation map from FIG. 3.

As depicted, mapping specification 402 is the form of a table and includes information from the data transformation map from FIG. 3 and rules for converting a field in one format for a software application to an equivalent field in another format for another software application. For example, column 404 includes an object in a format for a source software application. The object in column 404 corresponds to object 306 in FIG. 3. In a similar fashion, column 408 includes an object in a format for a target software application. The object in column 408 is equivalent to the object in column 404. In this illustrative example, column 408 includes an object that corresponds to object 308 in FIG. 3.

In addition, column 406 includes fields in a format for the source software application. In this illustrative example, fields in column 406 correspond to field 310, field 314, field 318, field 322, and field 326 in FIG. 3. In a similar fashion, column 410 includes fields in a format for the target software application. In this illustrative example, fields in column 410 is equivalent to fields in column 406. In this illustrative example, column 408 includes fields that correspond to field 312, field 316, field 320, field 324, and field 328 in FIG. 3. In addition, column 412 includes rules for converting fields in column 406 into equivalent fields in column 410.

It should be understood that the illustration of the mapping specification in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, the mapping specification in the form of a table is only one embodiment that the mapping specification can be implemented. The mapping specification can also be in other forms of data structure such as trees, graphs, arrays, lists, or any suitable data structure.

Turning now to FIG. 5, a flowchart of a process for managing data transformation tools is depicted in accordance with an illustrative embodiment. The process in FIG. 5 can be implemented in hardware, software, or both. When implemented in software, the process can take the form of program instructions that are run by one of more processor units located in one or more hardware devices in one or more computer systems. For example, the process can be implemented in data transformation assistant 220 in computer system 204 in FIG. 2.

The process begins by selecting a foundation model to retrieve content of respective user manuals for a number of data transformation tools (step 500). In step 500, the number of data transformation tools use different data formats to store information such as data transformation maps.

The process generates a large language model from the foundation model based on the content of user manuals for the number of data transformation tools and a number of scripts for automation bots for the number of data transformation tools (step 502). In this illustrative example, the large language model is an artificial intelligence model that performs natural language processing to generate instructions for automation bots based on the content of user manuals and the number of scripts for the automation bots.

The process generates a number of new automation bots for each data transformation tool in the number of data transformation tools using the large language model (step 504). In step 504, each new automation bot is configured to perform an operation in the data transformation tool associated with each automation bot.

The process performs a number of operations associated with data transformation maps in the number of data transformation tools using the number of new automation bots (step 506). The process terminates thereafter.

Figure 6:
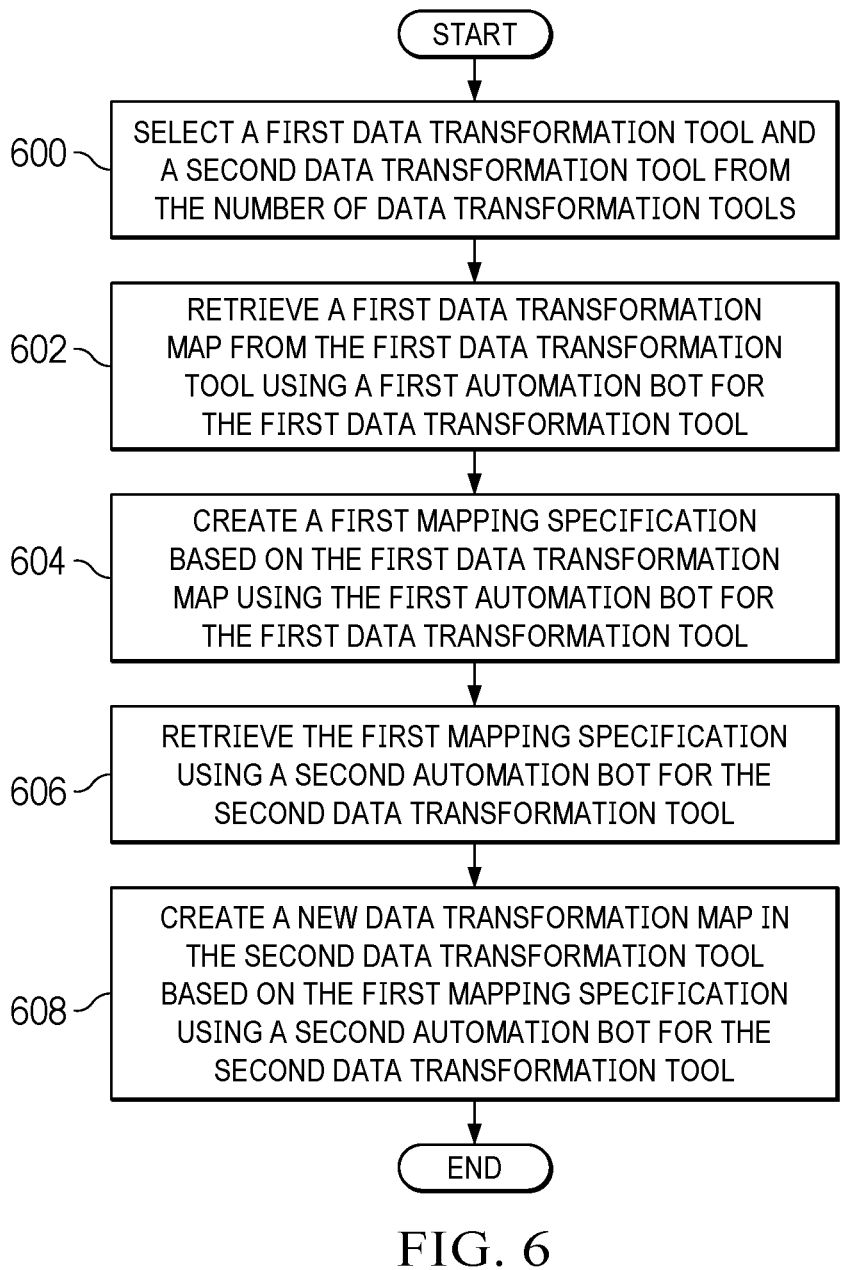
FIG. 6 is a flowchart of a process for migrating data transformation maps from one data transformation tool to another data transformation tool in accordance with an illustrative embodiment.

Turning next to FIG. 6, a flowchart of a process for migrating the data transformation map from one data transformation tool to another data transformation tool is depicted in accordance with an illustrative embodiment. The process in this flowchart is an example of an implementation for step 506 in FIG. 5.

The process begins by selecting a first data transformation tool and a second data transformation tool from the number of data transformation tools (step 600). The process retrieves a first data transformation map from the first data transformation tool using a first automation bot for the first data transformation tool (step 602). In step 602, the first data transformation map is a pre-existing data transformation map, and the first automation bot is an automation bot from the number of new automation bots. The process creates a first mapping specification based on the first data transformation map using the first automation bot for the first data transformation tool (step 604).

The process retrieves the first mapping specification using a second automation bot for the second data transformation tool (step 606). In step 606, the second automation bot is an automation bot from the number of new automation bots. The process creates a new data transformation map in the second data transformation tool based on the first mapping specification using the second automation bot for the second data transformation tool (step 608). The process terminates thereafter.

Figure 7:
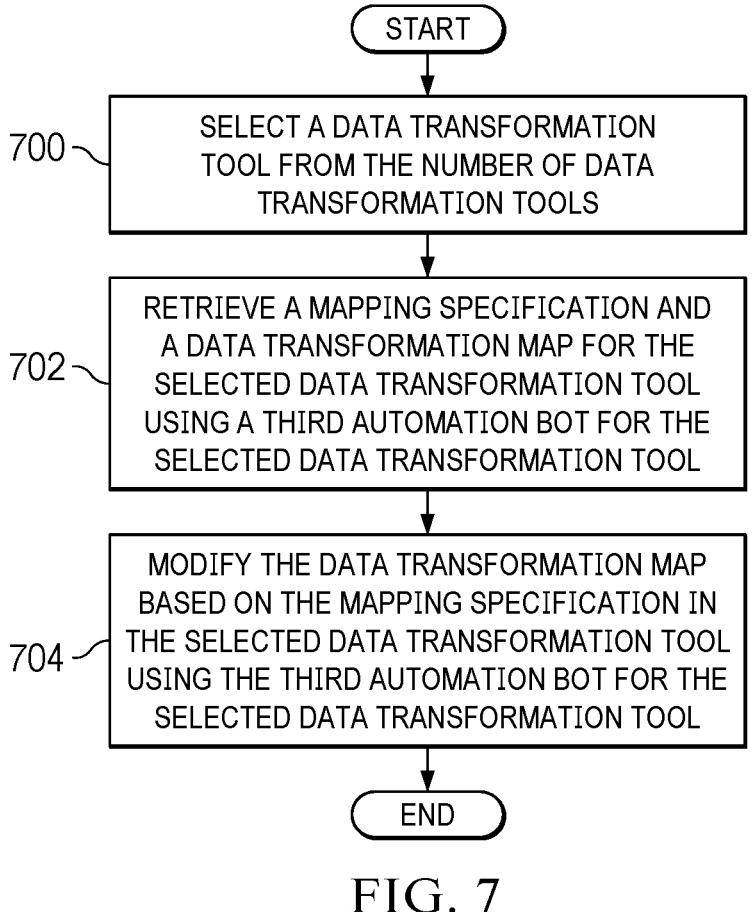
FIG. 7 is a flowchart of a process for modifying a preexisting data transformation map in accordance with an illustrative embodiment.

Turning next to FIG. 7, a flowchart of a process for modifying a pre-existing data transformation map is depicted in accordance with an illustrative embodiment. The process in this flowchart is an example of an implementation for step 506 in FIG. 5.

The process begins by selecting a data transformation tool from the number of data transformation tools (step 700). The process retrieves a mapping specification and a data transformation map for the selected data transformation tool using a third automation bot for the selected data transformation tool (step 702). In step 702, the data transformation map is a pre-existing data transformation map, the mapping specification is a pre-existing mapping specification, and the third automation bot is an automation bot from the number of new automation bots. The process modifies the data transformation map based on the mapping specification in the selected data transformation tool using the third automation bot for the selected data transformation tool (step 704). The process terminates thereafter.

Figure 8:
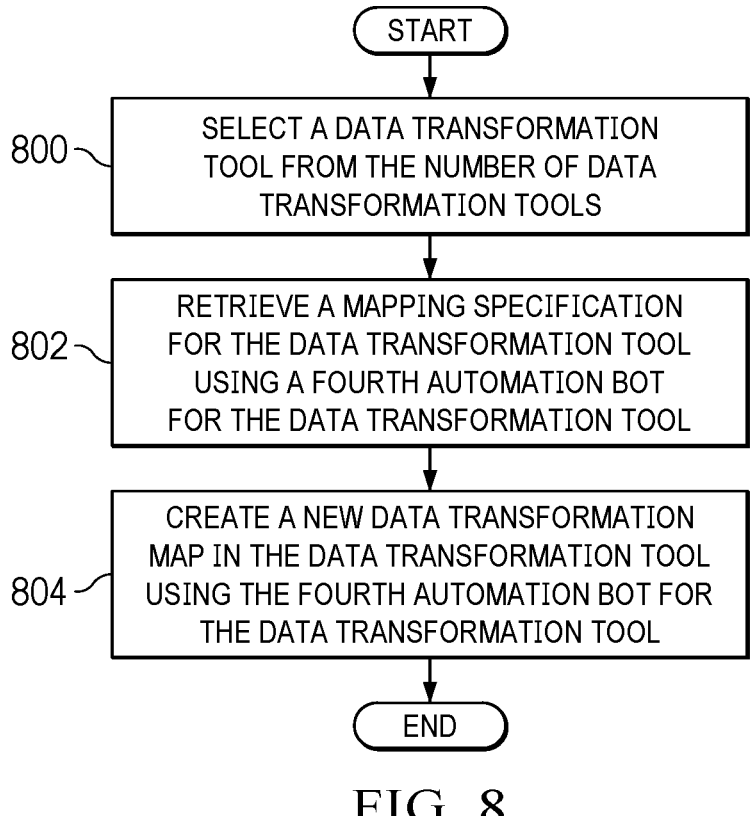
FIG. 8 is a flowchart of a process for creating new data transformation maps in accordance with an illustrative embodiment.

Turning next to FIG. 8, a flowchart of a process for creating a new data transformation map is depicted in accordance with an illustrative embodiment. The process in this flowchart is an example of an implementation for step 506 in FIG. 5.

The process begins by selecting a data transformation tool from the number of data transformation tools (step 800). The process retrieves a mapping specification for the data transformation tool using a fourth automation bot for the data transformation tool (step 802). In step 802, the mapping specification is a pre-existing mapping specification, and the fourth automation bot is an automation bot from the number of new automation bots. The process creates a new data transformation map in the data transformation tool using the automation bot for the data transformation tool (step 804). The process terminates thereafter.

Figure 9:
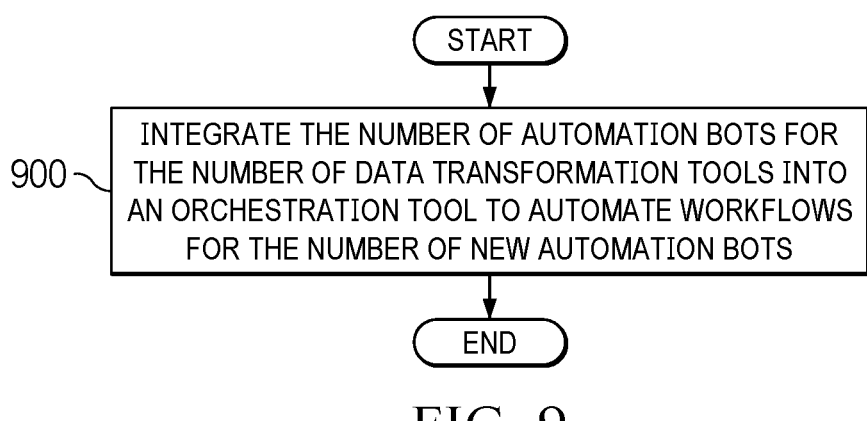
FIG. 9 is a flowchart of a process for integrating new automation bots into an orchestration tool in accordance with an illustrative embodiment.

Turning next to FIG. 9, a flowchart of a process for integrating new automation bots into an orchestration tool is depicted in accordance with an illustrative embodiment. The process in this figure is an example of an additional step that can be performed with the steps in FIG. 5.

The process begins by integrating the number of new automation bots for the number of data transformation tools into an orchestration tool to automate workflows for the number of new automation bots (step 900). The process terminates thereafter. In this illustrative example, the orchestration tool can be used to automate workflows for various scenarios for the number of new automation bots.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
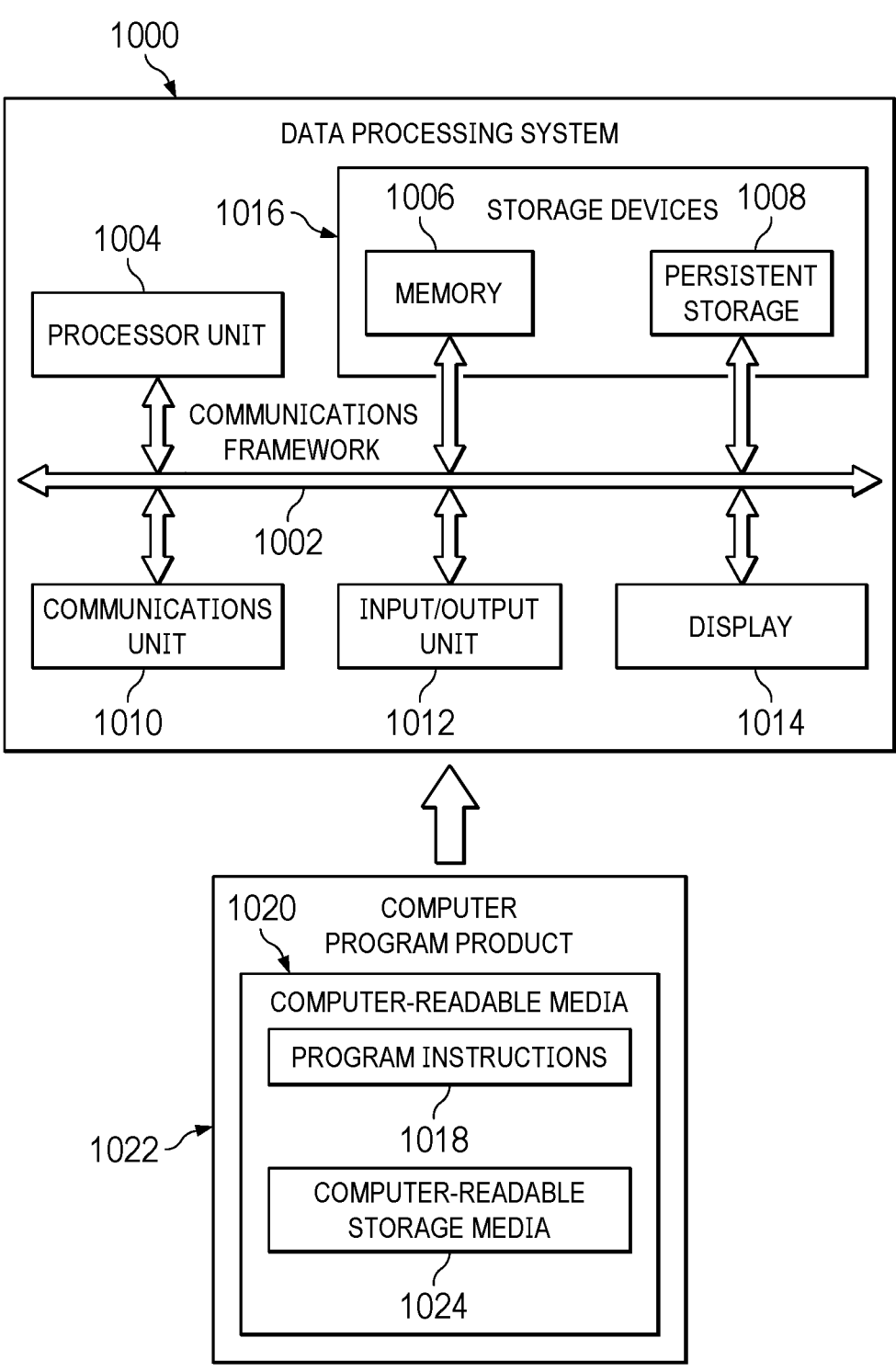
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement computers and computing devices in computing environment 100 in FIG. 1. Data processing system 1000 can also be used to implement computer system 204 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program instructions, computer usable program instructions, or computer-readable program instructions that can be read and executed by a processor in processor unit 1004. The program instructions in the different embodiments can be embodied on different physical or computer-readable storage media, such as memory 1006 or persistent storage 1008.

Program instructions 1018 are located in a functional form on computer-readable media 1020 that is selectively removable and can be loaded onto or transferred to data processing system 1000 for execution by processor unit 1004. Program instructions 1018 and computer-readable media 1020 form computer program product 1022 in these illustrative examples. In the illustrative example, computer-readable media 1020 is computer-readable storage media 1024.

Computer-readable storage media 1024 is a physical or tangible storage device used to store program instructions 1018 rather than a medium that propagates or transmits program instructions 1018. Computer-readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1018 can be transferred to data processing system 1000 using a computer-readable signal media. The computer-readable signal media are signals and can be, for example, a propagated data signal containing program instructions 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program instructions 1018 can be located in computer-readable media 1020 in the form of a single storage device or system. In another example, program instructions 1018 can be located in computer-readable media 1020 that is distributed in multiple data processing systems. In other words, some instructions in program instructions 1018 can be located in one data processing system while other instructions in program instructions 1018 can be located in one data processing system. For example, a portion of program instructions 1018 can be located in computer-readable media 1020 in a server computer while another portion of program instructions 1018 can be located in computer-readable media 1020 located in a set of client computers. The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

Thus, illustrative embodiments of the present invention provide a computer implemented method, computer system, and computer program product for managing data transformation tools. A processor set selects a foundation model to retrieve content of respective user manuals for a number of data transformation tools. The processor set generates a large language model from the foundation model based on the content of user manuals for the number of data transformation tools and a number of scripts for automation bots for the number of data transformation tools. The processor set generates a number of new automation bots for each data transformation tool in the number of data transformation tools using the large language model. The processor set performs a number of operations associated with data transformation maps in the number of data transformation tools using the number of new automaton bots. As result, increased efficiency is present in performing operations associated with data transformation maps in different data transformation tools.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing data transformation tools, the computer implemented method comprising:

selecting, by a processor set, a foundation model to process respective user manuals for a number of data transformation tools, wherein the number of data transformation tools use different data formats to store information;

generating, by the processor set, a large language model from the foundation model based on user manuals for the number of data transformation tools and a number of scripts for automation bots for the number of data transformation tools, wherein the automation bots are software robots for automating operations for the number of data transformation tools, and wherein the large language model is an artificial intelligence model that performs natural language processing to generate instructions for automation bots based on the user manuals and the number of scripts for the automation bots;

generating, by the processor set, a number of new automation bots for each data transformation tool in the number of data transformation tools using the large language model, wherein each new automation bot is configured to perform an operation in data transformation tools associated with each new automation bot;

selecting, by the processor set, a first data transformation tool and a second data transformation tool from the number of data transformation tools;

retrieving, by the processor set, a first data transformation map from the first data transformation tool using a first automation bot for the first data transformation tool, wherein the first data transformation map is a pre-existing data transformation map, and wherein the first automation bot is an automation bot from the number of new automation bots;

creating, by the processor set, a first mapping specification based on the first data transformation map using the first automation bot for the first data transformation tool;

retrieving, by the processor set, the first mapping specification using a second automation bot for the second data transformation tool, wherein the second automation bot is an automation bot from the number of new automation bots; and creating, by the processor set using the second automation bot for the second data transformation tool, a new data transformation map in the second data transformation tool based on the first mapping specification.

2. The computer implemented method of claim 1, wherein performing, by the number of new automation bots, the number of operations associated with data transformation maps in the number of data transformation tools comprises:

selecting, by the processor set, a data transformation tool from the number of data transformation tools;

retrieving, by the processor set using a third automation bot for the selected data transformation tool, a mapping specification and a data transformation map for the selected data transformation tool, wherein the third automation bot is an automation bot from the number of new automation bots; and modifying, by the processor set, the data transformation map based on the mapping specification in the selected data transformation tool using the third automation bot for the selected data transformation tool.

3. The computer implemented method of claim 1, wherein performing, by the number of new automation bots, the number of operations associated with data transformation maps in the number of data transformation tools comprises:

selecting, by the processor set, a data transformation tool from the number of data transformation tools;

retrieving, by the processor set, a mapping specification for the data transformation tool using a fourth automation bot for the data transformation tool, wherein the fourth automation bot is an automation bot from the number of new automation bots; and creating, by the processor set, a new data transformation map in the data transformation tool using the fourth automation bot for the data transformation tool.

4. The computer implemented method of claim 1 further comprising:

integrating, by the processor set, the number of new automation bots for the number of data transformation tools into an orchestration tool to automate workflows for the number of new automation bots.

5. The computer implemented method of claim 1, wherein the number of operations in the number of data transformation tools are performed using visual data transformation map designers of respective data transformation tools or through hypertext markup language (HTML) export of data transformation maps.

6. The computer implemented method of claim 1, wherein the foundation model is selected based on language used in the user manuals for the number of data transformation tools.

7. A computer system comprising:

a processor set;

a set of one or more computer-readable storage media; and program instructions, collectively stored in the set of one or more storage media, for causing the processor set to perform the following computer operations:

select a foundation model to process respective user manuals for a number of data transformation tools, wherein the number of data transformation tools use different data formats to store information;

generate a large language model from the foundation model based on user manuals for the number of data transformation tools and a number of scripts for automation bots for the number of data transformation tools, wherein the automation bots are software robots for automating operations for the number of data transformation tools, and wherein the large language model is an artificial intelligence model that perform natural language processing to generate instructions for automation bots based on the user manuals and the number of scripts for the automation bots;

generate a number of new automation bots for each data transformation tool in the number of data transformation tools using the large language model, wherein each new automation bot is configured to perform an operation in data transformation tools associated with each new automation bot; and select a first data transformation tool and a second data transformation tool from the number of data transformation tools;

retrieve a first data transformation map from the first data transformation tool using a first automation bot for the first data transformation tool, wherein the first data transformation map is a pre-existing data transformation map, and wherein the first automation bot is an automation bot from the number of new automation bots;

creating, by the processor set, a first mapping specification based on the first data transformation map using the first automation bot for the first data transformation tool;

retrieve the first mapping specification using a second automation bot for the second data transformation tool, wherein the second automation bot is an automation bot from the number of new automation bots; and create a new data transformation map in the second data transformation tool based on the first mapping specification using the second automation bot for the second data transformation tool.

8. The computer system of claim 7, wherein as part of performing the number of operations associated with data transformation maps in the number of data transformation tools using the number of new automation bots, the program instructions, collectively stored in the set of one or more storage media, cause the processor set to perform the following computer operations:

select a data transformation tool from the number of data transformation tools;

retrieve a mapping specification and a data transformation map for the selected data transformation tool using a third automation bot for the selected data transformation tool, wherein the third automation bot is an automation bot from the number of new automation bots; and modify the data transformation map based on the mapping specification in the selected data transformation tool using the third automation bot for the selected data transformation tool.

9. The computer system of claim 7, wherein as part of performing the number of operations associated with data transformation maps in the number of data transformation tools using the number of new automation bots, the program instructions, collectively stored in the set of one or more storage media, cause the processor set to perform the following computer operations:

select a data transformation tool from the number of data transformation tools;

retrieve a mapping specification for the data transformation tool using a fourth automation bot for the data transformation tool, wherein the fourth automation bot is an automation bot from the number of new automation bots; and create a new data transformation map in the data transformation tool using the fourth automation bot for the data transformation tool.

10. The computer system of claim 7, wherein the program instructions, collectively stored in the set of one or more storage media, cause the processor set to perform the following computer operations:

integrate the number of new automation bots for the number of data transformation tools into an orchestration tool to automate workflows for the number of new automation bots.

11. The computer system of claim 7, wherein the number of operations in the number of data transformation tools are performed using visual data transformation map designers of respective data transformation tools or through hypertext markup language (HTML) export of data transformation maps.

12. The computer system of claim 7, wherein the foundation model is selected based on language used in the user manuals for the number of data transformation tools.

13. A computer program product for managing data transformation tools, the computer program product comprising:

a set of one or more computer-readable storage media;

program instructions, collectively stored in the set of one or more storage media, cause a processor set to perform the following computer operations:

select a foundation model to process respective user manuals for a number of data transformation tools, wherein the number of data transformation tools use different data formats to store information;

generate a large language model from the foundation model based on user manuals for the number of data transformation tools and a number of scripts for automation bots for the number of data transformation tools, wherein the automation bots are software robots for automating operations for the number of data transformation tools, and wherein the large language model is an artificial intelligence model that perform natural language processing to generate instructions for automation bots based on the user manuals and the number of scripts for the automation bots;

generate a number of new automation bots for each data transformation tool in the number of data transformation tools using the large language model, wherein each new automation bot is configured to perform an operation in data transformation tools associated with each new automation bot;

select a first data transformation tool and a second data transformation tool from the number of data transformation tools:

retrieve a first data transformation map from the first data transformation tool using a first automation bot for the first data transformation tool, wherein the first data transformation map is a pre-existing data transformation map, and wherein the first automation bot is an automation bot from the number of new automation bots;

creating, by the processor set, a first mapping specification based on the first data transformation map using the first automation bot for the first data transformation tool;

retrieve the first mapping specification using a second automation bot for the second data transformation tool, wherein the second automation bot is an automation bot from the number of new automation bots; and create a new data transformation map in the second data transformation tool based on the first mapping specification using the second automation bot for the second data transformation tool.

14. The computer program product of claim 13, wherein as part of perform the number of operations associated with data transformation maps in the number of data transformation tools using the number of new automation bots, the operation performed by the processor set comprises:

select a data transformation tool from the number of data transformation tools;

retrieve a mapping specification and a data transformation map for the selected data transformation tool using a third automation bot for the selected data transformation tool, wherein the third automation bot is an automation bot from the number of new automation bots; and modify the data transformation map based on the mapping specification in the selected data transformation tool using the third automation bot for the selected data transformation tool.

15. The computer program product of claim 13, wherein as part of perform the number of operations associated with data transformation maps in the number of data transformation tools using the number of new automation bots, the operation performed by the processor set comprises:

select a data transformation tool from the number of data transformation tools;

retrieve a mapping specification for the data transformation tool using a fourth automation bot for the data transformation tool, wherein the fourth automation bot is an automation bot from the number of new automation bots; and create a new data transformation map in the data transformation tool using the fourth automation bot for the data transformation tool.

16. The computer program product of claim 13, wherein program instructions, collectively stored in the set of one or more storage media further cause the processor set to:

integrate the number of automation bots for the number of data transformation tools into an orchestration tool to automate workflows for various scenarios of the number of new automation bots.

17. The computer program product of claim 13, wherein the number of operations in the number of data transformation tools are performed using visual data transformation map designers of data transformation tools or through hypertext markup language (HTML) export of data transformation maps.

* * * * *